(12) United States Patent
Shin et al.

(10) Patent No.: US 12,050,730 B2
(45) Date of Patent: Jul. 30, 2024

(54) SYSTEM AND METHOD FOR REPRODUCING TACTILE CONTENT USING SPATIAL INFORMATION

(71) Applicant: Electronics and Telecommunications Research Institute, Daejeon (KR)

(72) Inventors: Sung Yong Shin, Daejeon (KR); Moo Seop Kim, Daejeon (KR); Chi Yoon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 102 days.

(21) Appl. No.: 17/844,208

(22) Filed: Jun. 20, 2022

(65) Prior Publication Data
US 2023/0259210 A1 Aug. 17, 2023

(30) Foreign Application Priority Data
Feb. 16, 2022 (KR) .................. 10-2022-0020077

(51) Int. Cl.
*G08B 6/00* (2006.01)
*G06F 3/01* (2006.01)
*G06F 3/16* (2006.01)

(52) U.S. Cl.
CPC .............. *G06F 3/016* (2013.01); *G06F 3/16* (2013.01)

(58) Field of Classification Search
USPC ............ 463/30, 1, 47.1, 47.2, 48, 49, 58, 463/FOR. 000; 340/407.1, 850, 853.1, 340/870.01, 901, 906, 907, 932.2, 933, 340/944, 945, 984, 988, 425.5, 146.2, 340/500, 1.1, 286.01, 425.1, 815.4, 384.1, 340/999, FOR. 000, FOR. 311, FOR. 415,
(Continued)

(56) References Cited

U.S. PATENT DOCUMENTS 9,712,738 B2 *   7/2017   Van Heugten ....... H04N 23/959
2005/0113167 A1 *   5/2005   Buchner .............. A63F 13/217
463/30
(Continued)

FOREIGN PATENT DOCUMENTS

| KR | 20210008117 A | 1/2021 |
|---|---|---|
| KR | 102286822 B1 | 8/2021 |
| KR | 1020210116599 A | 9/2021 |

OTHER PUBLICATIONS

Mark D. Fletcher, Can Haptic Stimulation Enhance Music Perception in Hearing-Impaired Listeners?, Frontiers in Neuroscience, Haptic Enhancement of Music Perception, vol. 15, Article 723877, Aug. 31, 2021, fnins.2021.723877.

(Continued)

*Primary Examiner* — Daniel Previl
(74) *Attorney, Agent, or Firm* — William Park & Associates Ltd.

(57) ABSTRACT

Disclosed are a system and method for reproducing tactile content using spatial information, which enhances a users tactile sense of music by converting a sound of music played in a space into tactile sense in real time without any sense of difference between tactile and auditory sense and automatically correcting tactile information by reflecting a user location and spatial characteristics so that performance or image information may be realized as tactile content using spatial information and the user location.

17 Claims, 7 Drawing Sheets

(58) Field of Classification Search
USPC .......... 340/FOR. 465, 407.2, 815.46, 815.5,
340/815.79, 384.3, 384.73, 943, 991–993,
340/426.22; 386/201, 200, 235, 239, 236,
386/278, 291, 300, 314, 326, 343, 356,
386/358, E9.001, E5.001, FOR. 000,
386/FOR. 100, FOR. 145; 600/410, 300,
600/1, 9, 16, 19, 21; 345/8, 156, 418,
345/501, 204, 530; 348/340, 362,
348/E5.024, 14.01, 21, 22, 24, 25, 31, 32;
349/138, 142, 194, 33, 1, 19, 56, 167,
349/182, 193, FOR. 000, 187; 710/305,
710/1, 10, 100, 104, 110, 15, 30, 31, 38,
710/8, 9, 200, 240, 220, 260, FOR. 000;
713/1, 100, 182, 150, 187, 188, 189, 300,
713/375, 400, 500, 600, FOR. 000,
713/FOR. 400; 102/387, 301, 334, 335,
102/362, 363, 364, 367, 366, 371, 372;
210/137, 241, 251, 321.72, 85, 96.1, 97,
210/138, 141, 143, 153, 150, 173;
250/206, 208.2, 215, 222.1, 578.1, 250,
250/251, 252.1, 253, 271, 281, 301;
359/618, 629, 1, 107, 196.1, 227, 237,
359/325, 326, 333; 370/242, 352, 389,
370/390, 401, 419, 431, 432, 445, 457,
370/474, 503, 200, 201, 202; 382/128,
382/100, 155, 162, 168, 173, 181, 232,
382/254; 700/1, 11; 702/28; 703/11, 2;
709/220; 714/100; 84/600, 615, 678,
84/724; 89/1.51
See application file for complete search history.

(56) References Cited

U.S. PATENT DOCUMENTS

| | | | | |
|---|---|---|---|---|
| 2009/0174671 | A1* | 7/2009 | Tachi | G06F 3/016 345/173 |
| 2014/0139327 | A1* | 5/2014 | Bau | G06F 3/016 340/407.1 |
| 2014/0330410 | A1* | 11/2014 | Lochmann | G06V 40/23 700/91 |
| 2015/0022443 | A1* | 1/2015 | Richter | G06F 3/016 345/156 |
| 2018/0096222 | A1* | 4/2018 | Yoon | G06V 10/443 |
| 2019/0075269 | A1* | 3/2019 | Nashida | H04N 21/44218 |
| 2020/0138320 | A1* | 5/2020 | Parvizi | A61B 5/291 |
| 2021/0121656 | A1* | 4/2021 | Kim | G16H 20/30 |
| 2021/0201698 | A1* | 7/2021 | Park | G09B 21/003 |
| 2022/0264055 | A1* | 8/2022 | Foessel | H04N 23/69 |

OTHER PUBLICATIONS

Dong Yeong Jeong et al., "Motion & Haptic effects classification of a 4D cinema seat", Proceedings of 2019 Spring Conference of ESK, Pohang, South Korea.

* cited by examiner

FIG. 6

SYSTEM AND METHOD FOR REPRODUCING TACTILE CONTENT USING SPATIAL INFORMATION

CROSS-REFERENCE TO RELATED APPLICATIONS

This application claims the benefit of the Korean Patent Application No. 10-2022-0020077 filed on Feb. 16, 2022, which is hereby incorporated by reference as if fully set forth herein.

BACKGROUND

Field of the Invention

The present invention relates to a sensory substitution system and method for converting acoustic information in a performance or image information into tactile information and additionally transmitting the converted tactile information, and more particularly, to a system and method for reproducing tactile content that may enhance the sense of touch by utilizing spatial information.

Discussion of the Related Art

Recently, various researches and products that transmit sound as tactile information have emerged. The sense of touch may play a role of more realistically delivering acoustic information, which was only provided through hearing, and is a very effective sense that may deliver acoustic information to users who cannot access music due to deterioration or loss of auditory function.

Meanwhile, the best way to enjoy music is to listen to the music directly at an actual performance hall. The sound of a performance hall is affected by various types of spatial information such as a structure and size of the hall, a seating location and a distance from the performance and when a user listens to sound in an actual performance hall, the user may enjoy it more realistically by harmonizing with the senses of the human body, such as sight, hearing, and spatial sense Therefore, even in the case of sensor replacement, which replaces hearing with tactile sense, if a difference according to the space is reflected, the converted tactile sense and the senses such as sight, hearing, and spatial sense of the human body may be harmonized so that the user may enjoy more realistically.

However, the existing acoustic-tactile conversion device is limited to simply converting data of a reproduced sound source into a tactile signal, without reflecting information on a sound that changes according to the user's location and performance space, having problems and limitations in that there is a sense of heterogeneity between tactile and auditory sense.

Therefore, there is demand for technology development that may enhance the sense of reality to feel the music through tactile sense by converting sound of music played in a large space, such as a performance hall, into tactile sense in real time in a state in which there is no or minimized sense of difference between tactile and auditory sense and automatically correcting tactile information to reflect a user's location and spatial characteristics.

SUMMARY

An aspect of the present invention is directed to providing a system and method for reproducing tactile content that converts acoustic information of a performance or video into tactile information using spatial information and a user location.

To achieve these and other advantages and in accordance with the purpose of the invention, as embodied and broadly described herein, there is provided a system for producing tactile content using spatial information including an acoustic-tactile conversion device generating one or more spatial tactile values corresponding to a location of each viewer by converting acoustic information generated in a spatial specific position; and one or more tactile reproducing devices provided to each viewer and generating a tactile stimulation based on a received special tactile value corresponding to a user's position, among the one or more spatial tactile values.

The acoustic-tactile conversion device may include: an acoustic-tactile converter receiving the acoustic information and perform acoustic-tactile conversion to generate an acoustic-tactile conversion value; a location analyzer acquiring location information from each of the one or more tactile reproducing devices; and a spatial tactile value generator re-converting the acoustic-tactile conversion value based on the location information of each tactile reproducing device to generate one or more spatial tactile values for each of one or more positions.

The spatial tactile value generator may generate the spatial tactile value for each location based on the acoustic-tactile conversion value converted in real time by the acoustic-tactile converter and a spatial tactile change value for each location reflecting the spatial information, and then transmit a corresponding spatial tactile value to the one or more tactile reproducing devices disposed at each location.

The spatial tactile value generator may generate an acoustic-tactile conversion map including a plurality of actual acoustic-tactile conversion values converted by receiving and converting a reference sound input through a stereo microphone by a plurality of optimizers dispersedly arranged in a space and an estimated acoustic-tactile conversion value for each location estimated based on a location layout of the tactile reproducing device in a space, and the acoustic-tactile converter may obtain a difference matrix of an acoustic-tactile conversion value for each location in the acoustic-tactile conversion map and a reference acoustic-tactile conversion value obtained by directly converting the reference sound to calculate and optimize a space tactile change value for each location.

The plurality of optimizers may be arranged as three or more optimizers in the space.

The spatial tactile value generator may receive a viewer feedback received from the tactile reproducing device, and generate the spatial tactile value by further considering the received viewer feedback.

The tactile reproducing device may include: a location information transmitter transmitting location information of its own to the acoustic-tactile conversion device; a control signal generator generating a control signal for generating a tactile stimulus based on the spatial tactile value; and a tactile regenerator generating a tactile stimulus according to the control signal.

The system may further include a user feedback transmitter receiving feedback on at least one of the use of spatial tactile reproduction, an intensity and period of vibration included in the tactile stimulus from the viewer and transmitting the received feedback to the acoustic-tactile conversion device.

The tactile reproducing device may be configured in any one of a gripping type, a wearable type, and an attachable type.

In another aspect of the present invention, there is provided a method for reproducing tactile content using spatial information including: generating one or more spatial tactile values corresponding to each viewer by converting a sound generated in a specific location of a space through an acoustic-tactile conversion device and transmitting the generated spatial tactile value to a tactile reproducing device at each corresponding position; and generating a tactile stimulus based on the spatial tactile value through one or more tactile reproducing devices provided to each viewer.

The transmitting may include: an optimization step of calculating, in advance, a spatial tactile change value, which is a spatial tactile change value according to a location of each viewer, for each location of the tactile reproducing device; generating a spatial tactile value for each location by re-converting the acoustic-tactile conversion value obtained by converting a sound into a tactile sense based on the spatial tactile change value when a sound is generated in a space; and transmitting the spatial tactile value.

The optimization step may include: generating a reference acoustic-tactile conversion value by converting a reference sound reproduced through a speaker at a specific location in a performance hall; generating an acoustic-tactile conversion map corresponding to an arrangement state of the tactile reproducing device for each location by converting the reference sound propagated differently for each location of the tactile reproducing device; and calculating a spatial tactile change value for each location by obtaining a difference between the reference acoustic-tactile conversion value and the acoustic-tactile conversion value for each location included in the acoustic-tactile conversion map.

The generating of the acoustic-tactile conversion map may include: converting the reference sound input through a plurality of microphones dispersedly arranged in the performance hall into a tactile sense to generate an actually measured acoustic-tactile conversion value; estimating an acoustic-tactile conversion value of a location where the microphone is not disposed based on the actually measured acoustic-tactile conversion value and a seating arrangement state in the corresponding space; and generating an acoustic-tactile conversion map including the actually measured acoustic-tactile conversion value and the estimated acoustic-tactile conversion value according to a location situation of the tactile reproducing device.

The generating of the spatial tactile value may include: generating, in real time, an acoustic-tactile conversion value obtained by converting a spatially generated sound into a tactile sense; and generating a spatial tactile value for each location as a sum matrix of the acoustic-tactile conversion value and the spatial tactile change value for each location obtained in the optimization step, wherein the spatial tactile value may be generated in further consideration of a viewer feedback transferred from the tactile reproducing device.

In the transmitting, the ID of the tactile reproducing device and the spatial tactile value corresponding to the location of the tactile reproducing device may be transmitted together.

In another aspect of the present invention, there is provided a method for reproducing tactile content using spatial information as a reality tactile sense providing method for providing a reality tactile sense for each location through a tactile reproducing device disposed in a plurality of positions in a space by converting a sound generated in a space into a tactile sense, including: an optimization step of calculating a spatial tactile change value, which is a change value for an acoustic-tactile conversion value according to each location in the space; converting a sound generated at a specific location in space in real time and generating one or more spatial tactile values corresponding to positions of each viewer by applying the spatial tactile change value; and providing a tactile stimulus according to the spatial tactile value.

The generating of the spatial tactile value may include: generating, by the acoustic-tactile conversion device, a spatial tactile value by adding an acoustic-tactile conversion value obtained by converting a spatially generated sound into tactile sense in real time and the spatial tactile change value.

The generating of the spatial tactile value may include: storing, by each tactile reproducing device, a spatial tactile change value corresponding to a location thereof in advance; receiving, by all tactile reproducing devices, the same acoustic-tactile conversion value in common from the acoustic-tactile conversion device; and generating, by each tactile reproducing device, a spatial tactile value by adding the acoustic-tactile conversion value and the spatial tactile change value.

According to an aspect of the present invention, a sound of music played in a space such as a performance hall is converted in real time into tactile sense without any sense of difference between tactile and auditory sense, and automatically corrected by reflecting the user location and spatial characteristics, thereby increasing reality of music felt by the user based on the tactile sense.

In addition, according to an aspect of the present invention, reality and sound synchronization performance of a tactile device in a performance hall may be improved by providing asn acoustic-tactile conversion technology reflecting spatial information.

In addition, according to an aspect of the present invention, it is possible to provide a music performance through a tactile sense in a virtual space simulating a performance hall for the hearing impaired.

It is to be understood that both the foregoing general description and the following detailed description of the present invention are exemplary and explanatory and are intended to provide further explanation of the invention as claimed.

DETAILED DESCRIPTION OF THE INVENTION

Hereinafter, embodiments are presented to help the understanding of the present invention. However, the following embodiments are only provided to ease understanding of the present invention, and the content of the present invention is not limited by the embodiments.

Figure 1:
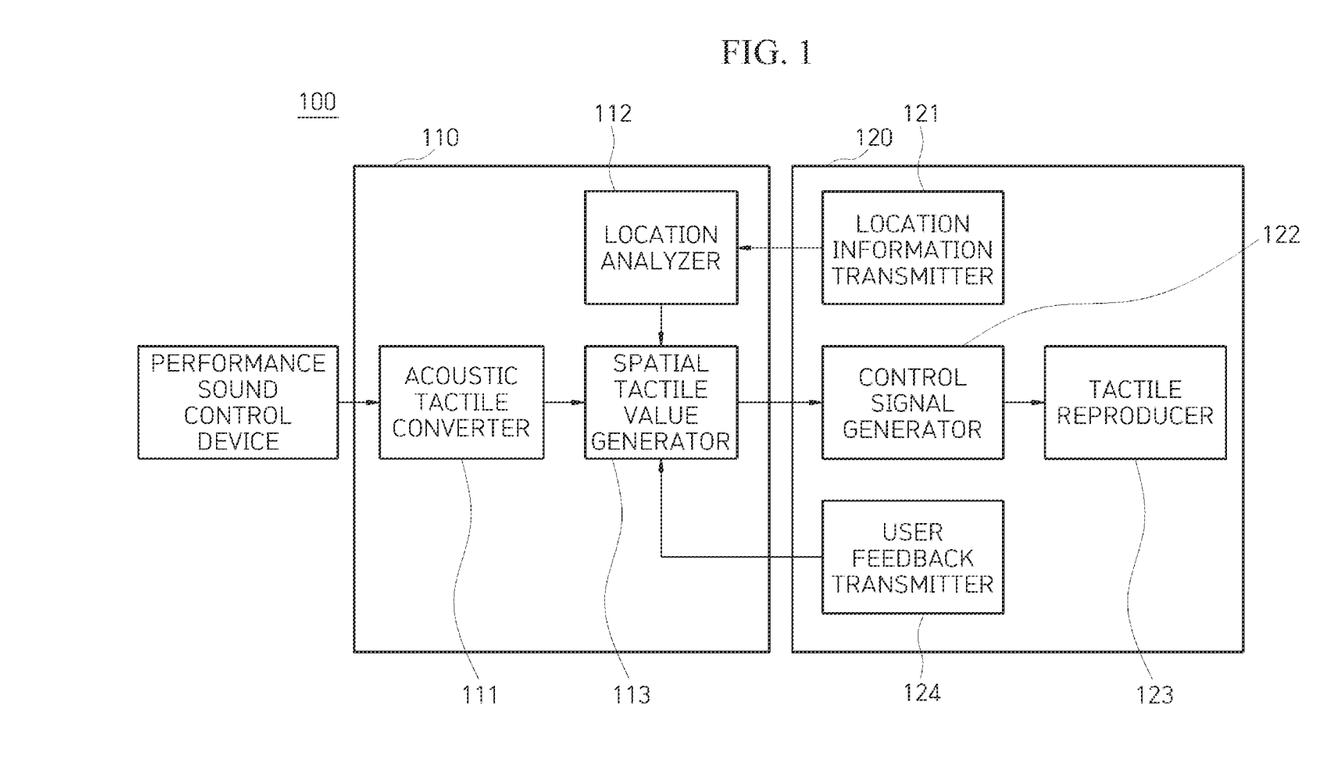
FIG. 1 is a diagram showing a configuration of a system 100 for reproducing tactile content using spatial information according to the present invention.

FIG. 1 is a diagram showing a configuration of a system 100 for reproducing tactile content using spatial information according to the present invention.

Referring to FIG. 1, the system 100 for reproducing tactile content using spatial information according to the present invention may include an acoustic-tactile conversion device 110 and one or more tactile reproducing devices 120.

The acoustic-tactile conversion device 110 serves to convert acoustic information generated by a performance sound control device in a performance hall into a tactile value corresponding to a location of each user (e.g., a location of each seat).

More specifically, the acoustic-tactile conversion device 110 may include three components.

An acoustic-tactile converter 111 receives acoustic information from the performance sound control device, performs an acoustic-tactile conversion on the received acoustic information to generate an acoustic-tactile conversion value enabling tactile reproduction.

A location analyzer 112 obtains location information from each tactile reproducing device 120 that is carried or worn by each user to determine the location of each tactile reproducing device 120. A plurality of viewers may be present in a performance hall, and in this case, the tactile reproducing device 120 may be provided to correspond to the number of viewers or the number of seats. Accordingly, the location analyzer 112 recognizes a location of each tactile reproducing device 120. In this case, there are several methods for the location analyzer 112 to recognize the location of the tactile reproducing device 120. For example, a method of permanently allocating and installing each tactile reproducing device 120 for each seat, a location recognition method using a Bluetooth beacon method, a location recognition method using a wireless LAN, etc. may be adopted.

The spatial tactile value generator 113 automatically converts a tactile value converted in real time by the acoustic-tactile converter 111 in consideration of the location information and spatial characteristics of each tactile reproducing device 120 to generate a spatial tactile value. That is, the spatial tactile value generator 113 generates the spatial tactile value for realistic reproduction at each location by re-converting the tactile value converted by the acoustic-tactile converter 111 in consideration of the location and spatial characteristics of each tactile reproducing device 120. A specific method and procedure for generating a spatial tactile value will be described later. Also, the spatial tactile value generator 113 may receive user feedback (whether to use tactile reproduction, preferred vibration intensity/period, etc.) from the tactile reproducing device 120 and generate the spatial tactile value by reflecting the received user feedback.

The tactile reproducing device 120 is provided to each user (corresponding to viewers in the case of a performance hall), and generates a tactile stimulus (e.g., vibration) based on the spatial tactile value transmitted through the acoustic-tactile conversion device 110, and transfers the generated tactile stimulus to each user. The tactile reproducing device 120 may be provided in the form of portable, gripping, or wearable clothing or attachable accessories such as rings, but is not limited thereto.

The tactile reproducing device 120 may include a control signal generator 122 generating a control signal for generating a tactile stimulus based on the spatial tactile value transmitted through the spatial tactile value generator 113, a tactile reproducer 123 reproducing a tactile stimulus according to the control signal from the control signal generator 122 so that the viewers may recognize the acoustic stimulus actually, and a user feedback transmitter 124 receiving a feedback as to whether a spatial tactile reproduction is used and an intensity and period of the vibration included in the tactile stimulus from the user and transferring the received feedback to the acoustic-tactile conversion device 110. The control signal generator 122 and the tactile regenerator 123 reproduce the spatial tactile value transmitted wirelessly as an actual tactile stimulus, and an existing product for reproducing the tactile sense may be used.

Meanwhile, when a location checking method of the tactile reproducing device 120 is transmitting its location to the acoustic-tactile conversion device 110, a location information transmitter 121 recognizing location information on the current location and transmitting the location information to the location analyzer 112 may be further included.

An example in which the acoustic-tactile conversion device 110 and the tactile reproducing device 120 described above are utilized will be described below. For example, a viewer (user) wears the tactile reproducing device 120 in the form of clothing or accessories, enters a performance hall, and moves to a designated seat or a desired seat. The location analyzer 112 of the acoustic-tactile conversion device 110 obtains location information from the tactile reproducing device 120 in real time, and when a performance sound is output through a speaker inside the performance hall, the location analyzer 112 transmits a tactile value corrected for the corresponding location (spatial tactile value) to the tactile reproducing device 120 worn by the viewer, and the viewer may feel a tactile stimulus for a sound actually audible in a space where the viewer is present through the tactile reproducing device 120. In this manner, a visual sense or feeling of the viewer at his/her location in the performance hall may coincide with an auditory sense as an alternative sense, so that the viewer may enjoy a more realistic performance.

The core of the present invention is to re-convert a tactile value (acoustic-tactile conversion value) obtained by converting a sound according to a spatial location and spatial characteristics to generate a spatial tactile value reflecting the user's location. To this end, it is necessary to perform a process of optimizing for each performance venue, i.e., obtaining a spatial-tactile change value, before generating the tactile value, which will be described with reference to FIGS. 2 and 3.

Figure 2:
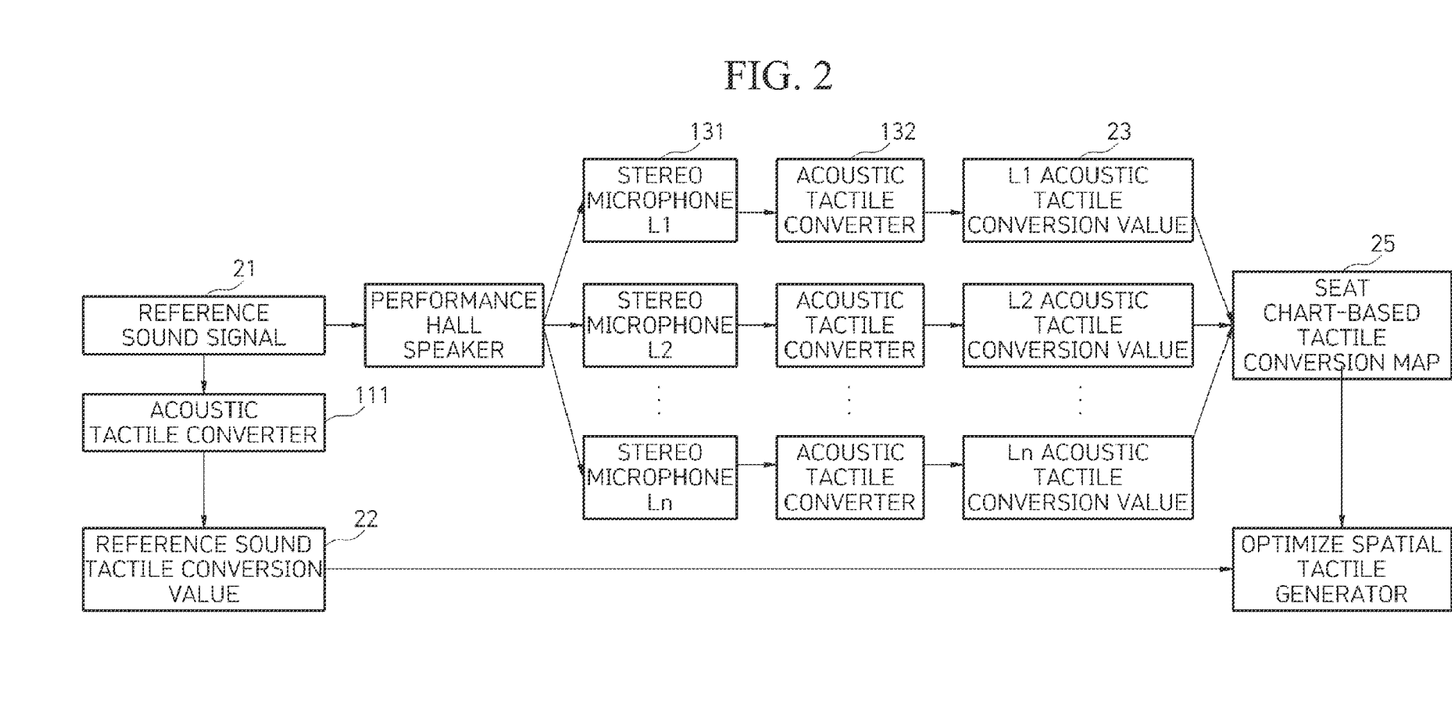
FIG. 2 is a diagram illustrating a process of optimizing a spatial tactile value generator 113.
Figure 3A:
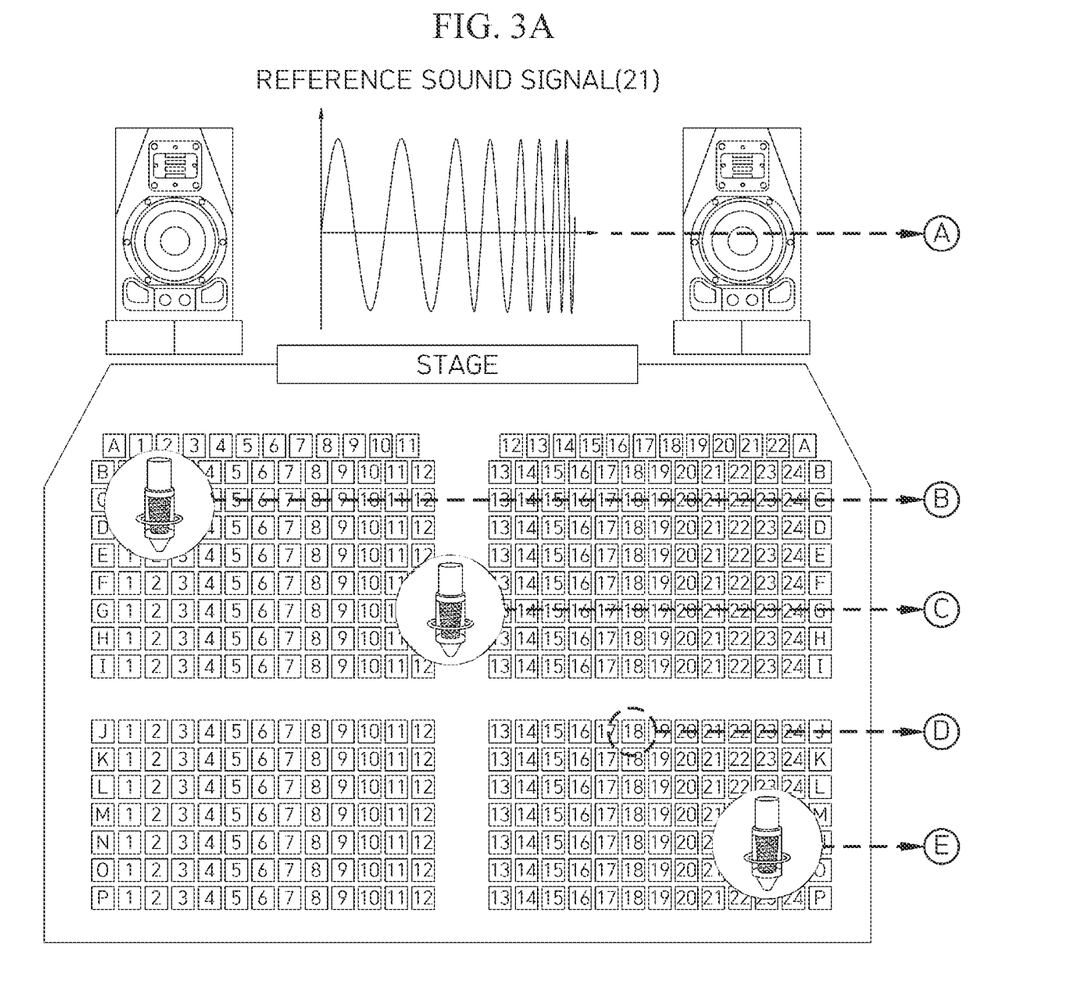
FIGS. 3A and 3B are diagrams illustrating an example of a processing process of the spatial tactile value generator 113 shown in FIG. 2.
Figure 3B:
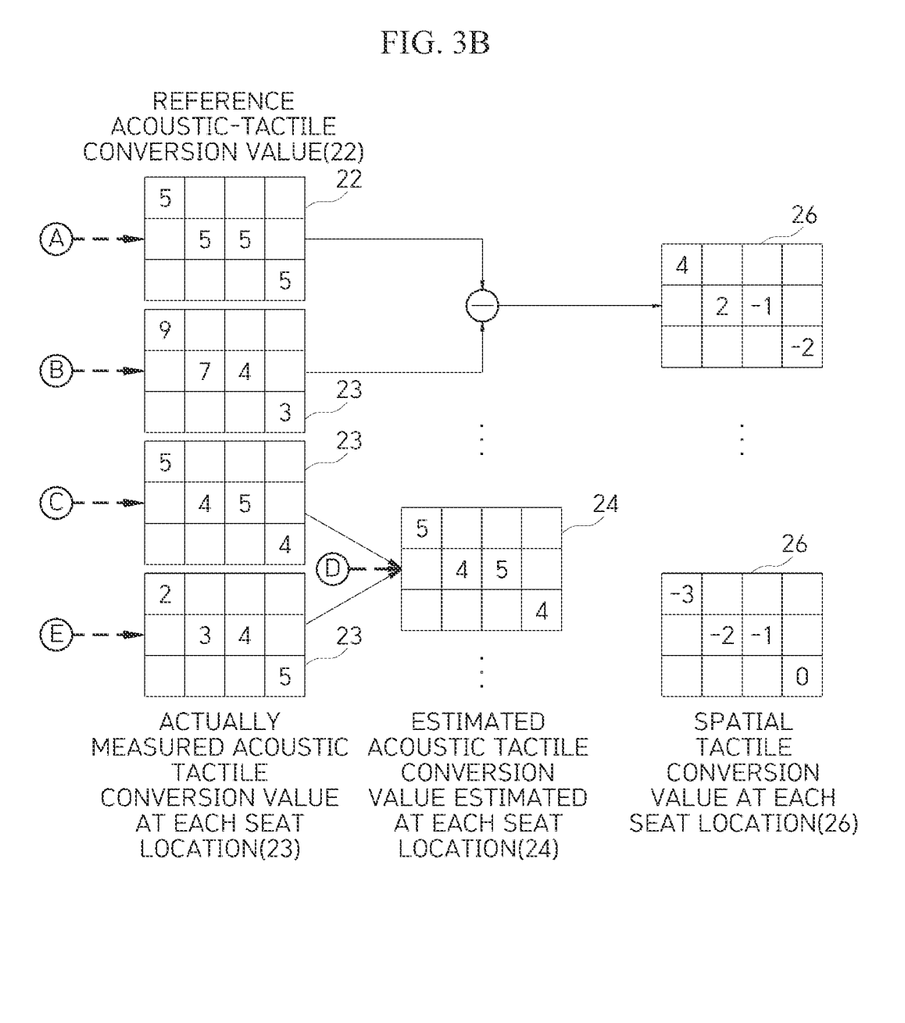

FIG. 2 is a diagram illustrating a process of optimizing the spatial tactile value generator 113, and FIGS. 3A and 3B are diagrams illustrating an example of optimization of the spatial tactile value generator 113 shown in FIG. 2.

For the sake of accuracy, it is preferable to perform the optimization process in a quiet environment before audience for performance is admitted, or for convenience, before a sound is emitted for performance after audience for performance is admitted by utilizing the tactile reproducing device 120 having a built-in microphone.

First, a reference sound signal [21] is reproduced through the speaker of the performance hall. Here, the reference sound signal [21] may be used as a variety of sound signals, and as an example, a frequency sweep signal sequentially going round all frequency regions may be used. The reference sound signal [21] is propagated to the performance hall through the speaker, and at the same time, a reference acoustic-tactile conversion value [22] is generated through the acoustic-tactile conversion device 111.

For optimization, an optimizer including a stereo microphone 131, an acoustic-tactile converter 132, and a transmitter (not shown) transmitting an acoustic-tactile converted value are used. The optimizer may be a separate device from the aforementioned tactile reproducing device 120, or a microphone and an acoustic-tactile converter may be added to the tactile reproducing device 120 to be used as an optimized.

The reference sound 1211 generated from the speaker is transferred to the stereo microphone 131 of the optimizer distributed across the seats in the performance hall. The number of distributed stereo microphones is not limited, and it is advantageous to use at least three positions in deriving an estimate value for the remaining seats (a location where the stereo microphone is not installed), and as the number increases, a more accurate estimate value may be obtained.

At this time, since the positions of the stereo microphones are different in the performance hall, even if the same reference sound is received, different sound input values are obtained according to the user's location, and a sound signal at each location is converted into a tactile value (actually measured acoustic-tactile conversion value) [23] through the acoustic-tactile converter 132 of the optimizer. The measured acoustic-tactile conversion value [23] is a value obtained by converting the reference sound received at each position, and since it has a different value for each spatial location even for the same reference sound, the measured acoustic-tactile conversion value [23] is a conversion value reflecting spatial specificity.

A conversion value for a seat where the microphone is not placed is estimated for each seat based on the actual acoustic-tactile conversion value converted at the location of the surrounding microphone and a seat chart in the corresponding performance hall. As a method of estimating the reference acoustic-tactile conversion value [24] for each seat where the microphone is not disposed, various function-based estimation methods of the related art may be applied.

Based on three or more actually measured reference acoustic-tactile conversion values [23] obtained through actual measurement and conversion with a microphone and one or more estimated reference acoustic-tactile conversion values [24] estimated therefrom, an acoustic-tactile conversion map [25] corresponding to the seat chart is generated.

Thereafter, the acoustic-tactile conversion values [23, 24] for each location are extracted from the acoustic-tactile conversion map [25] corresponding to the seat chart (or a tactile reproducing device layout), and as shown in FIGS. 3A and 3B, the sound tactile converter 111 calculates a spatial tactile change value [26] for each location by obtaining a difference from the reference acoustic-tactile conversion value [22] obtained by directly converting the reference sound signal.

The generation of the conversion map and the calculation of the spatial tactile change value [26] may be performed by the acoustic-tactile conversion device 110 or a separate server (not shown).

The spatial tactile value generator 113 is optimized based on the spatial tactile change value [26] for each location (by seat) of each tactile reproducing device 120, and during an actual performance, an optimal tactile value for realistic reproduction according to each location in space, that is, spatial tactile value [40], is generated based on a performance acoustic-tactile conversion value [31] obtained by converting a performance sound and the spatial tactile change value [26] obtained in the optimization process.

A process of generating a spatial tactile value [40] in real time during a performance and reproducing a tactile pattern therefrom will be described with reference to FIGS. 4 and 5.

Figure 4:
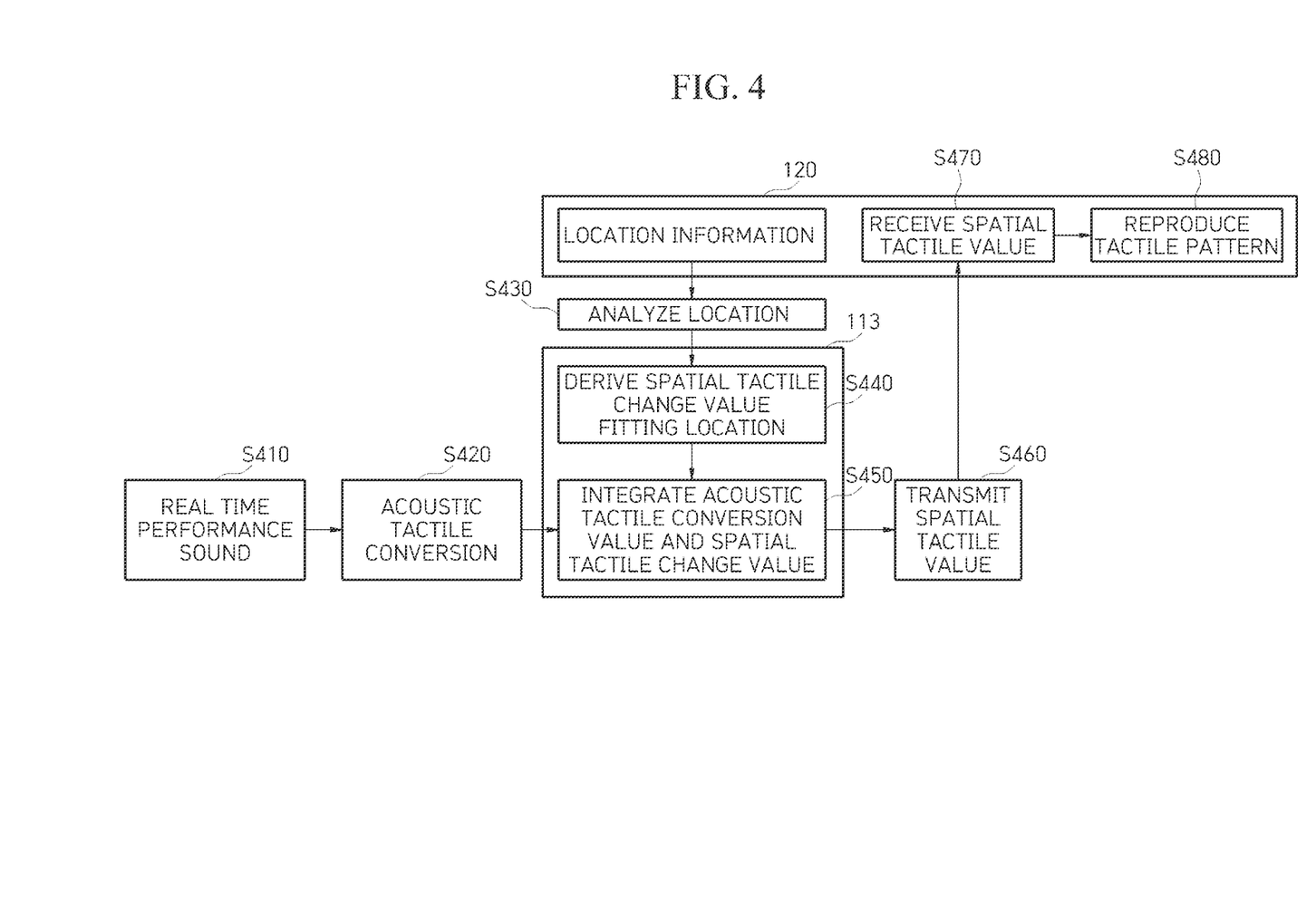
FIG. 4 is a diagram illustrating a process of regenerating a spatial tactile value in real time using the spatial tactile value generator 113.

As shown in FIG. 4, when a performance sound 1301 actually used in a performance is generated (S410), it is converted into a performance acoustic-tactile conversion value [31] in real time by the acoustic-tactile converter 111 (S420). The location analyzer 112 acquires and analyzes location information of the tactile reproducing device 120 worn by the viewer (S430). The spatial tactile value generator 113 checks the spatial tactile change value [26] derived from the optimization process for each location described above (S440), derives a spatial tactile value [40] of the tactile reproducing device 120 for each location using the performance acoustic-tactile conversion value [31] and the spatial tactile change value [26] for each location and transmits the derived spatial tactile value [40] to the tactile reproducing device 120 at each location (S460).

The tactile reproducing device 120 receives the spatial tactile value [40] corresponding to its location (S470), and reproduces a tactile pattern by using the received spatial tactile value [40] (S480).

Figure 5A:
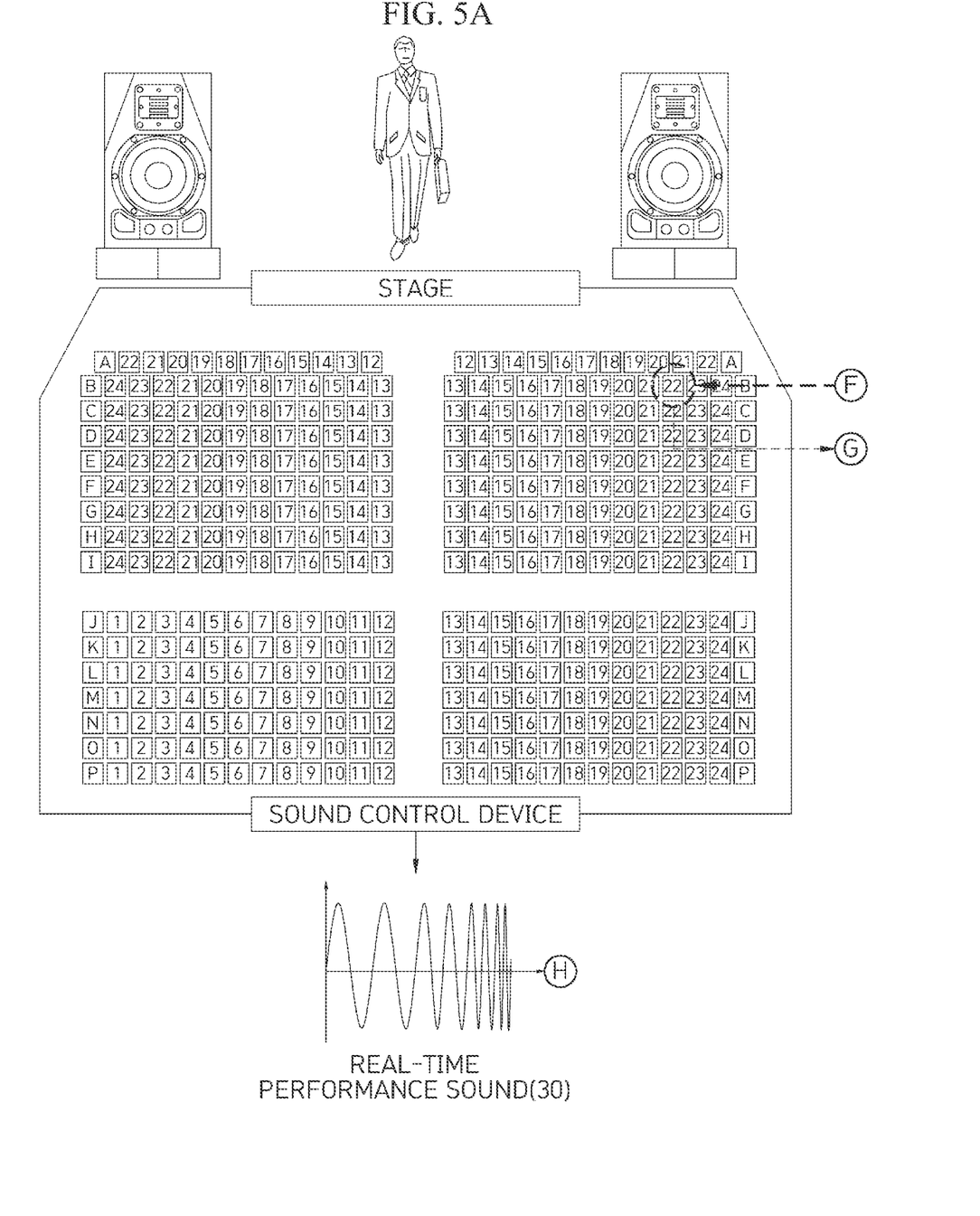
FIGS. 5A and 5B are diagrams illustrating an example of a process of regenerating a spatial tactile value in real time using the spatial tactile value generator 113 shown in FIG. 4.
Figure 5B:
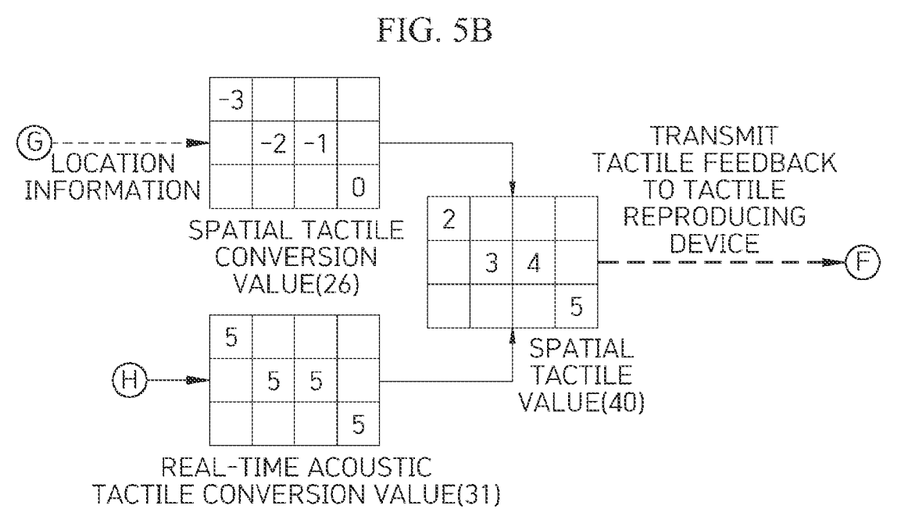

FIGS. 5A and 5B are exemplary diagrams of obtaining the spatial tactile value [40], illustrating an example of obtaining the spatial tactile value [40] for each location by using the real-time performance acoustic-tactile conversion value [31] and spatial tactile change value [26] at each location.

The spatial tactile value [40] may be calculated through the acoustic-tactile change value [31] and the spatial tactile change value [26], and may be derived through the reverse order of the optimization method shown in FIGS. 3A and 3B. That is, the spatial tactile value [40] enabling realistic tactile reproduction at each location is obtained as a sum matrix of the acoustic-tactile change value [31] and the spatial tactile change value [26] for each location.

Meanwhile, as described above, the spatial tactile value generator 113 transmits the obtained spatial tactile value for each location to the tactile reproducing device 120 for each location. To this end, the spatial tactile value generator 113 prepares a table (not shown) using an identifier of each tactile reproducing device 120 as an index during the optimization process and storing the spatial tactile change value for each tactile reproducing device 120, and during the performance, the spatial tactile value generator 113 generates a spatial tactile value by adding the performance acoustic-tactile conversion value to each spatial tactile change value of the table in real time during performance and transmits the generated spatial tactile value together with an ID of the tactile reproducing device 120.

Each tactile reproducing device 120 receives a spatial tactile value fitting its location by identifying a plurality of transmitted spatial tactile values by IDs, and reproduces a tactile pattern based on the received spatial tactile value.

As another embodiment, the tactile reproducing device 120 pre-stores a corresponding spatial tactile change value among the spatial tactile change values calculated in the optimization process, and during an actual performance, all the tactile reproducing device 120 commonly receive the performance acoustic-tactile conversion value not considering spatial characteristics and location from the acoustic-tactile conversion device 110, and each tactile reproducing device 120 generates a spatial tactile value considering its location by adding previously stored spatial tactile change value and the performance acoustic-tactile conversion value received in real time, and generates a tactile stimulus using the generated spatial tactile value.

In this case, since the acoustic-tactile conversion device 110 only needs to broadcast the performance acoustic-tactile conversion value in real time during the performance, there is no need to generate and individually transmit spatial tactile values for each tactile reproducing device 120, so real-time performance may be improved, and since there is no need to store/manage spatial tactile change values for each tactile reproducing device 120, the configuration and operation may be simplified. However, the amount of calculation of each tactile reproducing device 120 may increase to require more computing resources for each tactile reproducing device 120, which may increase manufacturing costs of the tactile reproducing device 120. In addition, since a person skilled in the art may make other various modifications and changes within the scope of the technical idea of the present invention, a suitable detailed configuration may be selectively operated in consideration of spatial characteristics of each situation to which the present invention is to be applied and the number of necessary tactile reproducing devices 120.

Figure 6:
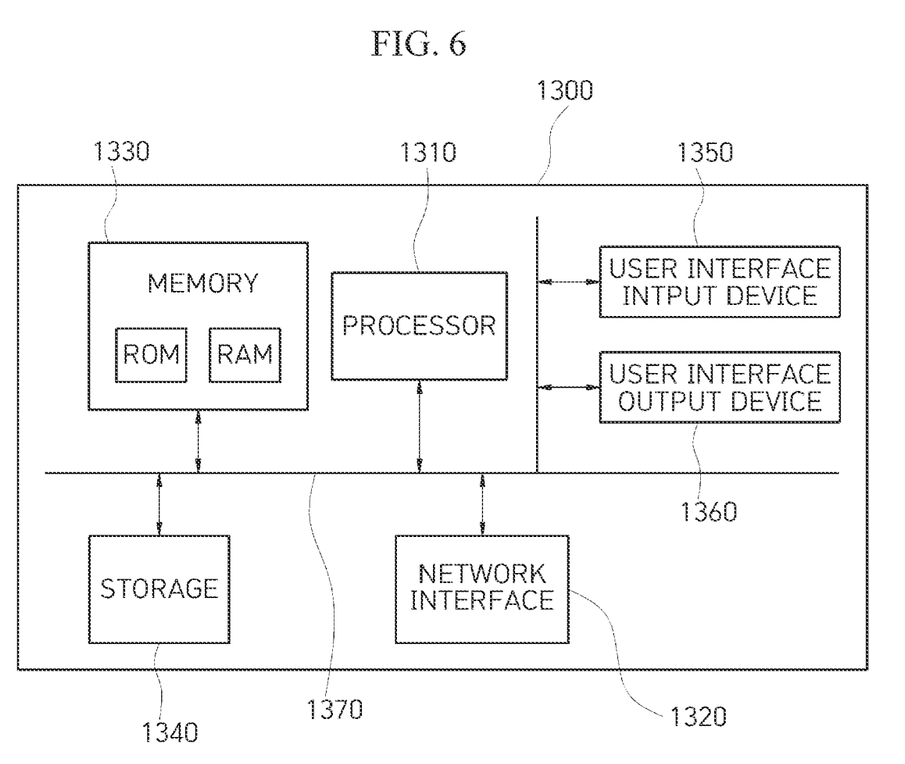
FIG. 6 is a block diagram illustrating a computer system for implementing a method according to an embodiment of the present invention.

FIG. 6 is a block diagram illustrating a computer system for implementing a method according to an embodiment of the present invention.

Referring to FIG. 6, a method according to an embodiment of the present invention may be implemented in a computer system. Also, some or all of the components included in the system shown in FIG. 1 may be embedded in a computer system 1300.

The computer system 1300 may include at least one of a processor 1310, a memory 1330, an input interface device 1350, an output interface device 1360, and a storage device 1340 in communication via a bus 1370. The computer system 1300 may also include a communication device 1320 coupled to a network. The processor 1310 may be a central processing unit (CPU) or a semiconductor device that executes instructions stored in the memory 1330 or the storage device 1340. The memory 1330 and the storage device 1340 may include various types of volatile or non-volatile storage mediums. For example, the memory may include read only memory (ROM) and random access memory (RAM). In the embodiment of the present invention, the memory may be located inside or outside the processor and may be connected to the processor through various known units. The memory is a volatile or non-volatile storage medium of various types. For example, the memory may include a read-only memory (ROM) or a random access memory (RAM).

Accordingly, an embodiment of the present invention may be implemented according to a method implemented in a computer or may be implemented as a non-transitory computer-readable medium having computer-executable instructions stored therein. In an embodiment, when executed by a processor, the computer readable instructions may perform a method according to at least one aspect of the present invention.

The communication device 1320 may transmit or receive a wired signal or a wireless signal.

In addition, the method according to an embodiment of the present invention may be implemented in the form of program instructions that may be executed by various computer units and may be recorded in a computer-readable medium.

The computer-readable medium may include program instructions, data files, data structures, etc. alone or in combination. The program instructions recorded in the computer-readable medium may be specially designed and configured for the embodiment of the present invention, or may be known and available to those skilled in the art of computer software. The computer-readable recording medium may include a hardware device configured to store and execute program instructions. For example, the computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices (e.g., read only memory (ROM), random access memory (RAM), or flash memory). In addition, program instructions may include high class language codes, which can be executed in a computer by using an interpreter, as well as machine codes made by a compiler It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A system for producing tactile content using spatial information, the system comprising:
    an acoustic-tactile conversion device generating one or more spatial tactile values corresponding to a location of each viewer by converting acoustic information generated in a spatial specific position; and
    one or more tactile reproducing devices provided to each viewer and generating a tactile stimulation based on a received special tactile value corresponding to a user's position, among the one or more spatial tactile values,
    wherein the acoustic-tactile conversion device includes:
        an acoustic-tactile converter receiving the acoustic information and perform acoustic-tactile conversion to generate an acoustic-tactile conversion value;
        a location analyzer acquiring location information from each of the one or more tactile reproducing devices; and
        a spatial tactile value generator re-converting the acoustic-tactile conversion value based on the location information of each tactile reproducing device to generate one or more spatial tactile values for each of one or more positions.

2. The system of claim 1, wherein
    the spatial tactile value generator generates the spatial tactile value for each location based on the acoustic-tactile conversion value converted in real time by the acoustic-tactile converter and a spatial tactile change value for each location reflecting the spatial information, and then transmits a corresponding spatial tactile value to the one or more tactile reproducing devices disposed at each location.

3. The system of claim 1, wherein
    the spatial tactile value generator generates an acoustic-tactile conversion map including a plurality of actual acoustic-tactile conversion values converted by receiving and converting a reference sound input through a stereo microphone by a plurality of optimizers dispersedly arranged in a space and an estimated acoustic-tactile conversion value for each location estimated based on a location layout of the tactile reproducing device in a space, and the acoustic-tactile converter obtains a difference matrix of an acoustic-tactile conversion value for each location in the acoustic-tactile conversion map and a reference acoustic-tactile conversion value obtained by directly converting the reference sound to calculate and optimize a space tactile change value for each location.

4. The system of claim 3, wherein the plurality of optimizers are arranged as three or more optimizers in the space.

5. The system of claim 1, wherein the spatial tactile value generator receives a viewer feedback received from the tactile reproducing device, and generates the spatial tactile value by further considering the received viewer feedback.

6. The system of claim 1, wherein the tactile reproducing device includes:
a location information transmitter transmitting location information of its own to the acoustic-tactile conversion device;
a control signal generator generating a control signal for generating a tactile stimulus based on the spatial tactile value; and
a tactile regenerator generating a tactile stimulus according to the control signal.

7. The system of claim 6, further comprising:
a user feedback transmitter receiving feedback on at least one of the use of spatial tactile reproduction, an intensity and period of vibration included in the tactile stimulus from the viewer and transmitting the received feedback to the acoustic-tactile conversion device.

8. The system of claim 1, wherein the tactile reproducing device is configured in any one of a gripping type, a wearable type, and an attachable type.

9. A method for reproducing tactile content using spatial information, the method comprising:
generating one or more spatial tactile values corresponding to each viewer by converting a sound generated in a specific location of a space through an acoustic-tactile conversion device and transmitting the generated spatial tactile value to a tactile reproducing device at each corresponding position; and
generating a tactile stimulus based on the spatial tactile value through one or more tactile reproducing devices provided to each viewer,
wherein the transmitting includes:
an optimization step of calculating, in advance, a spatial tactile change value, which is a spatial tactile change value according to a location of each viewer, for each location of the tactile reproducing device;
generating a spatial tactile value for each location by re-converting the acoustic-tactile conversion value obtained by converting a sound into a tactile sense based on the spatial tactile change value when a sound is generated in a space; and
transmitting the spatial tactile value.

10. The method of claim 9, wherein the optimization step includes:
generating a reference acoustic-tactile conversion value by converting a reference sound reproduced through a speaker at a specific location in a performance hall;
generating an acoustic-tactile conversion map corresponding to an arrangement state of the tactile reproducing device for each location by converting the reference sound propagated differently for each location of the tactile reproducing device; and
calculating a spatial tactile change value for each location by obtaining a difference between the reference acoustic-tactile conversion value and the acoustic-tactile conversion value for each location included in the acoustic-tactile conversion map.

11. The method of claim 10, wherein the generating of the acoustic-tactile conversion map includes:
converting the reference sound input through a plurality of microphones dispersedly arranged in the performance hall into a tactile sense to generate an actually measured acoustic-tactile conversion value;
estimating an acoustic-tactile conversion value of a location where the microphone is not disposed based on the actually measured acoustic-tactile conversion value and a seating arrangement state in the corresponding space; and
generating an acoustic-tactile conversion map including the actually measured acoustic-tactile conversion value and the estimated acoustic-tactile conversion value according to a location situation of the tactile reproducing device.

12. The method of claim 9, wherein the generating of the spatial tactile value includes:
generating, in real time, an acoustic-tactile conversion value obtained by converting a spatially generated sound into a tactile sense; and
generating a spatial tactile value for each location as a sum matrix of the acoustic-tactile conversion value and the spatial tactile change value for each location obtained in the optimization step.

13. The method of claim 9, wherein the generating of the spatial tactile value includes generating the spatial tactile value in further consideration of a viewer feedback transferred from the tactile reproducing device.

14. The method of claim 9, wherein, in the transmitting, the ID of the tactile reproducing device and the spatial tactile value corresponding to the location of the tactile reproducing device are transmitted together.

15. A method for reproducing tactile content using spatial information as a reality tactile sense providing method for providing a reality tactile sense for each location through a tactile reproducing device disposed in a plurality of positions in a space by converting a sound generated in a space into a tactile sense, the method comprising:
an optimization step of calculating a spatial tactile change value, which is a change value for an acoustic-tactile conversion value according to each location in the space;
converting a sound generated at a specific location in space in real time and generating one or more spatial tactile values corresponding to positions of each viewer by applying the spatial tactile change value; and
providing a tactile stimulus according to the spatial tactile value.

16. The method of claim 15, wherein the generating of the spatial tactile value includes:
generating, by the acoustic-tactile conversion device, a spatial tactile value by adding an acoustic-tactile conversion value obtained by converting a spatially generated sound into tactile sense in real time and the spatial tactile change value.

17. The method of claim 15, wherein the generating of the spatial tactile value includes:
storing, by each tactile reproducing device, a spatial tactile change value corresponding to a location thereof in advance;
receiving, by all tactile reproducing devices, the same acoustic-tactile conversion value in common from the acoustic-tactile conversion device; and generating, by each tactile reproducing device, a spatial tactile value by adding the acoustic-tactile conversion value and the spatial tactile change value.

* * * * *